US012242993B2

United States Patent
Silk et al.

(10) Patent No.: US 12,242,993 B2
(45) Date of Patent: Mar. 4, 2025

(54) MONITORING AND FEEDBACK SYSTEM FOR PROCESSING CONTAINER LOADS TO DIRECT PERFORMANCE OUTCOMES

(71) Applicant: ZEBRA TECHNOLOGIES CORPORATION, Lincolnshire, IL (US)

(72) Inventors: Seth David Silk, Barrington, IL (US); Gamaethige Sulak Soysa, San Jose, CA (US); Andrew Ehlers, Elmhurst, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 141 days.

(21) Appl. No.: 17/105,158

(22) Filed: Nov. 25, 2020

(65) Prior Publication Data

US 2022/0164727 A1    May 26, 2022

(51) Int. Cl.
*G06Q 10/0633* (2023.01)
*G06Q 10/087* (2023.01)
*H04L 67/12* (2022.01)

(52) U.S. Cl.
CPC ....... *G06Q 10/0633* (2013.01); *G06Q 10/087* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,503,026 A | 4/1996 | Bohm et al. | |
| 2007/0200701 A1* | 8/2007 | English | G06Q 10/08 340/572.1 |
| 2008/0230606 A1 | 9/2008 | Thompson et al. | |
| 2011/0070045 A1 | 3/2011 | Rawdon et al. | |
| 2013/0016636 A1 | 1/2013 | Berger et al. | |
| 2016/0239790 A1* | 8/2016 | Burch, V | G06Q 10/083 |
| 2019/0130417 A1* | 5/2019 | Watt | G06Q 30/018 |

OTHER PUBLICATIONS

International Search Report and Written Opinion for International Application No. PCT/US2021/056489 mailed on Jan. 27, 2022.
Novelty Search Report for Belgian Patent Application No. 2021/5919 mailed on Jul. 22, 2022.

* cited by examiner

*Primary Examiner* — Cory W Eskridge

(57) ABSTRACT

Feedback generation for a container load process includes digitizing a manual workflow into stages, assigning intermediate targets to each stage, monitoring the workflow, and generating notifications to exert feedback control over the workflow. Feedback generation can include: storing a set of load stage definitions defining sequential load stages of the load process, each stage definition including: an intermediate performance target, and a stage duration; responsive to arrival of a container at a load bay, receiving a task definition defining a performance target for the load process; retrieving the load stages in sequence and, for each stage: receiving sensor data depicting an interior of the container; determining, based on the sensor data, a performance measurement of the container load process, comparing the performance measurement to the intermediate performance target corresponding to the stage, and based on the comparison, generating an alert and/or status message for transmission to a client computing device.

18 Claims, 11 Drawing Sheets

MONITORING AND FEEDBACK SYSTEM FOR PROCESSING CONTAINER LOADS TO DIRECT PERFORMANCE OUTCOMES

BACKGROUND

Material handling facilities, such as warehouses and the like, are increasingly computerized to accommodate increasing volumes of freight and complexity in handling operations, while limiting the need for additional staff. Machine and computer vision technologies can allow monitoring of individual container operations within such facilities. However, the volume of such operations can lead to overload of recipients of the monitoring information, as well as communication networks carrying such information.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
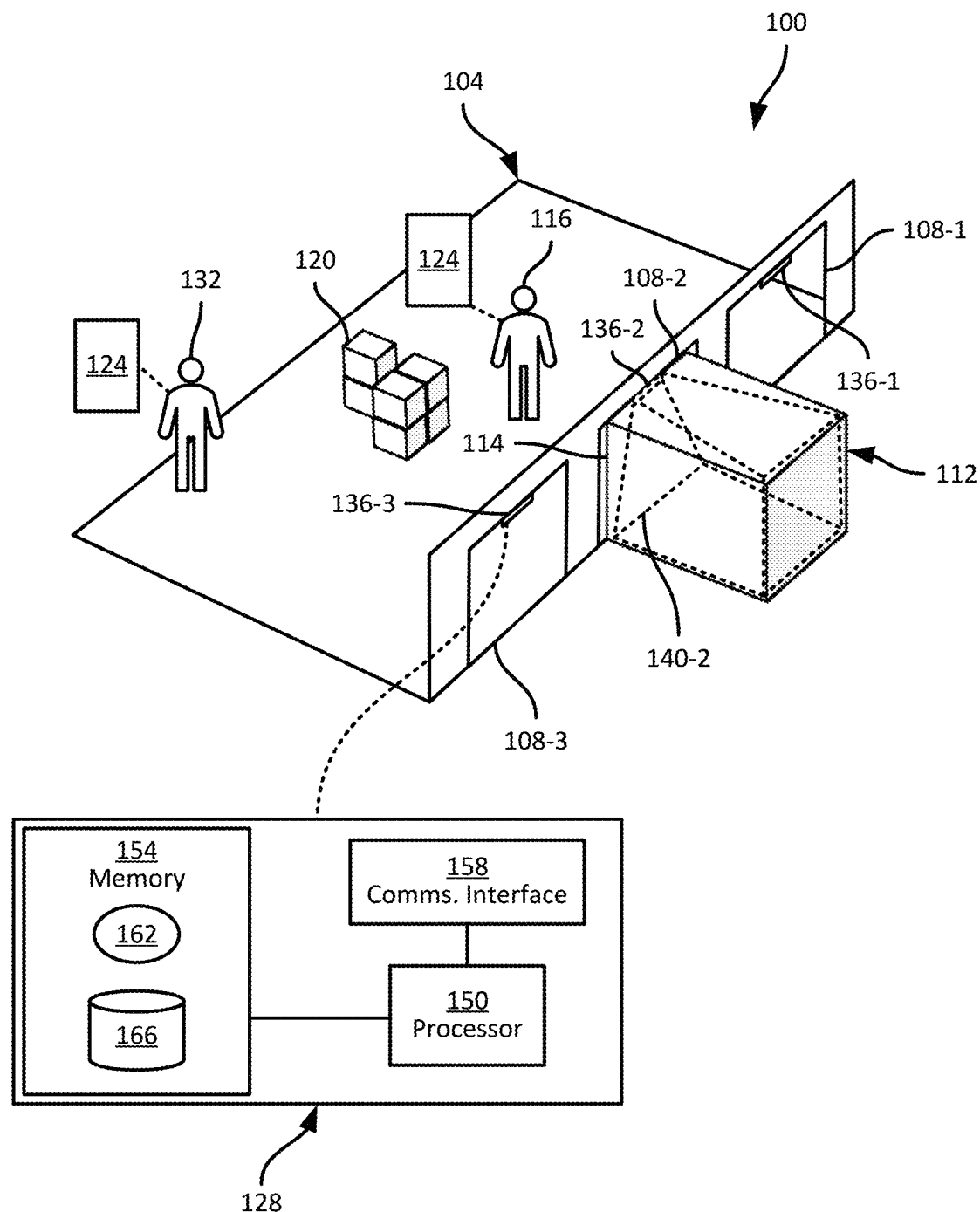
FIG. 1 is a diagram of a system for monitoring and feedback of container loading and unloading processes.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of generating feedback for a container load process, the method comprising: storing, in a memory of a computing device, a set of load stage definitions defining sequential load stages of the container load process, each stage definition including: (i) an intermediate performance target, and (ii) a stage duration; at a processor of the computing device, responsive to arrival of a container at a load bay, receiving a task definition defining a performance target for the load process; at the processor, retrieving the load stages in sequence and, for each stage: (i) receiving sensor data depicting an interior of the container, from a sensor assembly disposed at the load bay, (ii) determining, based on the sensor data, a performance measurement of the container load process, (iii) comparing the performance measurement to the intermediate performance target corresponding to the stage, and (iv) based on the comparison, generating an alert for transmission to a client computing device.

Additional examples disclosed herein are directed to a computing device for generating feedback for a container load process, the computing device comprising: a memory storing a set of load stage definitions defining sequential load stages of the container load process, each stage definition including: (i) an intermediate performance target, and (ii) a stage duration; a communications interface; and a processor configured to: responsive to arrival of a container at a load bay, receive a task definition defining a performance target for the load process; retrieve the load stages in sequence and, for each stage: (i) receive sensor data depicting an interior of the container, from a sensor assembly disposed at the load bay, (ii) determine, based on the sensor data, a performance measurement of the container load process, (iii) compare the performance measurement to the intermediate performance target corresponding to the stage, and (iv) based on the comparison, generate an alert for transmission to a client computing device.

FIG. 1 depicts a container loading and unloading system 100, including a facility 104 (e.g. a warehouse, manufacturing facility, retail facility, or the like) with at least one load bay 108. As illustrated, the facility 104 includes a portion of a building such as the above mentioned warehouse or the like, such as a cross dock or portion thereof, including the load bays 108. As will be apparent to those skilled in the art, the facility 104 can include other portions not illustrated in FIG. 1. In the illustrated example, three load bays 108-1, 108-2, and 108-3 are shown. The load bays 108 may, for example, be arranged along an outer wall of the facility 104, such that containers can approach the load bays from the exterior of the facility 104. In other examples, smaller or greater numbers of load bays 108 may be included. Further, although a single facility 104 is illustrated in FIG. 1, in some examples, the load bays 108 may be distributed across multiple physically distinct facilities. The load bays 108 are illustrated as being dock structures enabling access to an exterior of the facility 104 where a container 112 is placed, from within the facility 104. In other examples, one or more of the load bays 108 may be implemented as a load station within the facility 104, to load or unload containers that are handled inside the facility 104.

Each load bay 108 is configured to accommodate a container, such as the example container 112 shown in FIG. 1. In particular, the container 112 is shown approaching the load bay 108-2. The container 112 can be any container transportable by at least one of a vehicle, a train, a marine vessel, and an airplane, and configured to store transportable goods such as boxed and/or unboxed items and/or other types of freight. The container 112 may therefore be, for example, a semi-trailer including an enclosed box affixed to a platform including one or more sets of wheels and a hitch assembly for towing by a powered vehicle. In further examples, the container 112 may be the box portion of a box truck in which the container is affixed to the body of the vehicle which also supports a cab, powertrain, and the like. In other examples, the container can be a unit loading device (ULD) of the type employed to load luggage, freight and the like into aircraft. In such examples, the container 112 may be transported to and from load bays 108 by a vehicle such as a pallet truck or the like. In still further examples, a ULD is processed at a load bay 108 located within the facility 104 as noted above, rather than at a load bay 108 allowing access to the facility exterior.

Each load bay 108 includes an opening, e.g. in a wall of the facility 104, that enables staff and/or equipment within the facility 104 to access an interior of the container 112. For example, once the container 112 is placed at the load bay 108-2 as shown in FIG. 1, e.g. with a rear wall 114 of the container substantially flush with the opening of the load bay 108-2, a worker 116 within the facility 104 can begin moving items 120 from the facility 104 into the container 112. For the loading process, when the container 112 has been filled to a target level (as will be discussed below in greater detail), a door of the container 112 can be closed, and the container 112 can be withdrawn from the load bay 108-2 to make way for another container. As will now be apparent, a similar process may be implemented to unload the container 112, e.g. by the worker 116, to take delivery of items at the facility 104 for further processing. Thus, although the process described herein refers to loading the container 112 with the items 120, it will be understood that the functionality of the system 100 discussed below can equally be applied to unloading processes. Loading and unloading processes are referred to collectively herein as "load" processes.

The facility 104 may include a significant number of load bays 108 (e.g. some facilities may include hundreds of load bays 108), as well as a significant number of workers such as the worker 116. The nature of the items 120, and therefore the size, weight and handling requirements of the items 120, may vary from container to container. Further, the time available to fill a given container 112 may vary over the course of a day, week, or longer time period. Still further, the degree to which each container 112 is expected to be filled may vary over time.

The worker 116 may carry or otherwise operate a client computing device 124, such as a wearable computer, a tablet computer, a smartphone, or the like. The device 124 may receive messages, e.g. from a server 128, containing instructions for the worker 116. In other examples, the worker 116 may not be issued a computing device 124. The instructions may identify which items 120 are to be loaded into the current container 112, as well as the time available to load the container 112, the degree to which the container 112 is expected to be filled, and the like. The computing device 124 may also be mounted to a wall, suspended from the ceiling by a retention system, or other fixed portion of the facility 104 at or near the load bay 108-2. Each load bay 108 may include such a device.

Due to the variable nature of the items 120 and/or the containers 112 processed at the facility 104, as well as the complexity associated with allocating staff and containers 112 amongst potentially large numbers of load bays 108, certain load processes may, without intervention, fail to meet expected load times, fullness targets, or both. One or more supervisors 132 may be deployed throughout the facility 104, e.g. equipped with corresponding client devices 124. As noted above, in some examples the worker 116 is not provided with a client device 124, while the supervisor is provided with such a device. In other examples, both the worker 116 and the supervisor 132 are provided with client devices 124.

The supervisor 132 may have responsibility for allocating resources to the three load bays 108 shown in FIG. 1. In some systems, however, the number of load bays 108 under management by a given supervisor may render accurate assessment of performance at each bay 108 difficult, and therefore complicate the allocation of resources to the bays 108. Further, in facilities with large numbers of bays, and therefore large numbers of client computing devices 124 distributed among workers 116 and supervisors 132, internal networks (e.g. wireless local area networks) may become congested, reducing the ability of facility staff to carry out load processes effectively. In addition, the number of load bays 108 under the supervision of the supervisor 132 may lead to a volume of alerts or other information received at the client device 124 of the supervisor 132 sufficient to induce user fatigue, rendering the task of processing and acting on such information difficult for the supervisor 132. In turn, such fatigue may lead to operational effects such as disrupted loading and unloading processes and the like.

The system 100 therefore includes additional components and functionality to assess loading and unloading workflow rate and critical timing processes and convey such assessments to subsets of the client devices 124 while mitigating against network congestion and increasing the effectiveness with which each supervisor 132 can allocate resources to a set of load bays 108.

In particular, the load bays 108 include respective sensor assemblies 136-1, 136-2, and 136-3 each including at least one image and/or depth sensor. For example, each sensor assembly 136 can include an RGB camera and a depth camera. In other examples, the sensor assemblies 136 can include lidar sensors, ultrasound sensors, trip detectors, sonar devices, or the like, in addition to or instead of the above-mentioned cameras. Each sensor assembly 136 is positioned at the corresponding load bay 108 such that a field of view (FOV) 140 (the FOV 140-2 of the sensor assembly 136-2 is shown in FIG. 1) is aimed outwards from the load bay 108, into the interior of a container 112 docked at that load bay 108. In some examples, the sensor assembly 136 may be affixed to the container 112 itself, or the sensor assembly 136 can encompass sensors affixed within the container 112 as well as sensors affixed to the load bay 108.

The sensor assemblies 136 are therefore controllable, e.g. by the server 128, to capture sensor data such as images and/or depth measurements (e.g. point clouds) corresponding to the interior of docked containers 112. The server 128, in turn, is configured to process the sensor data to assess one or more current performance attributes (also referred to herein as performance measurements) for the load process. In some examples, the sensor assemblies 136 themselves can include processing hardware and software to determine at least a portion of the performance measurements for subsequent use by the server 128. The server 128 is further configured to determine whether to generate alerts and/or status messages (collectively referred to as notifications) according to the performance measurements, and to transmit such alerts and/or status messages to selected ones of the client devices 124. The alerts and/or status messages, as will be discussed below, may contain information indicating deviations from and conformance to expected performance as well as the severity of such deviations. In some examples, the alerts and/or status messages may also contain indications of actions to be taken to remedy performance deviations.

Thus, the server 128 enables the system 100 to provide substantially real-time feedback to the loading and unloading processes underway at the load bays 108, by measuring and evaluating current load performance via the sensor assemblies 136 and generating the above-mentioned alerts and/or status messages. The server 128 further mitigates over-consumption of network and device resources via such alerts, as discussed in greater detail below and thereby mitigates user 132 and/or 116 information fatigue.

The server 128 includes a central processing unit (CPU), also referred to as a processor 150, interconnected with a non-transitory computer readable storage medium, such as a memory 154. The memory 154 includes any suitable combination of volatile (e.g. Random Access Memory (RAM)) and non-volatile (e.g. read only memory (ROM), Electrically Erasable Programmable Read Only Memory (EEPROM), or flash) memory. The processor 150 and the memory 154 each comprise one or more integrated circuits (ICs).

The server 128 also includes a communications interface 158, enabling the server 128 to exchange data with other computing devices, such as the client devices 124. The communications interface 158 therefore includes any suitable hardware (e.g. transmitters, receivers, network interface controllers and the like) allowing the server 128 to communicate, e.g. over local and/or wide area networks.

The memory 154 stores a plurality of computer-readable instructions, e.g. in the form of a loading assessment application 162. The application 162 is executable by the processor 150 to implement various functionality performed by the server 128. As will be discussed below, the application 162 implements the assessment and alert generation mentioned above. The memory 154 also stores, in this example, a repository 166 containing data used in the assessment and alert generation mentioned above. In particular, the repository 166 contains a set of stage definitions, defining sequential stages of the container loading and unloading processes. The definition for each stage includes a duration of the stage, and an intermediate performance target for the stage. In brief, the duration sets a period of time after which the next stage is expected to begin, and the intermediate performance target sets an expected state of the container 112 when the above-mentioned duration expires. The stage definitions are employed by the server 128 along with performance measurements determined from the sensor data, to determine whether and when to generate alerts and status information for transmission to the client devices 124.

Figure 2:
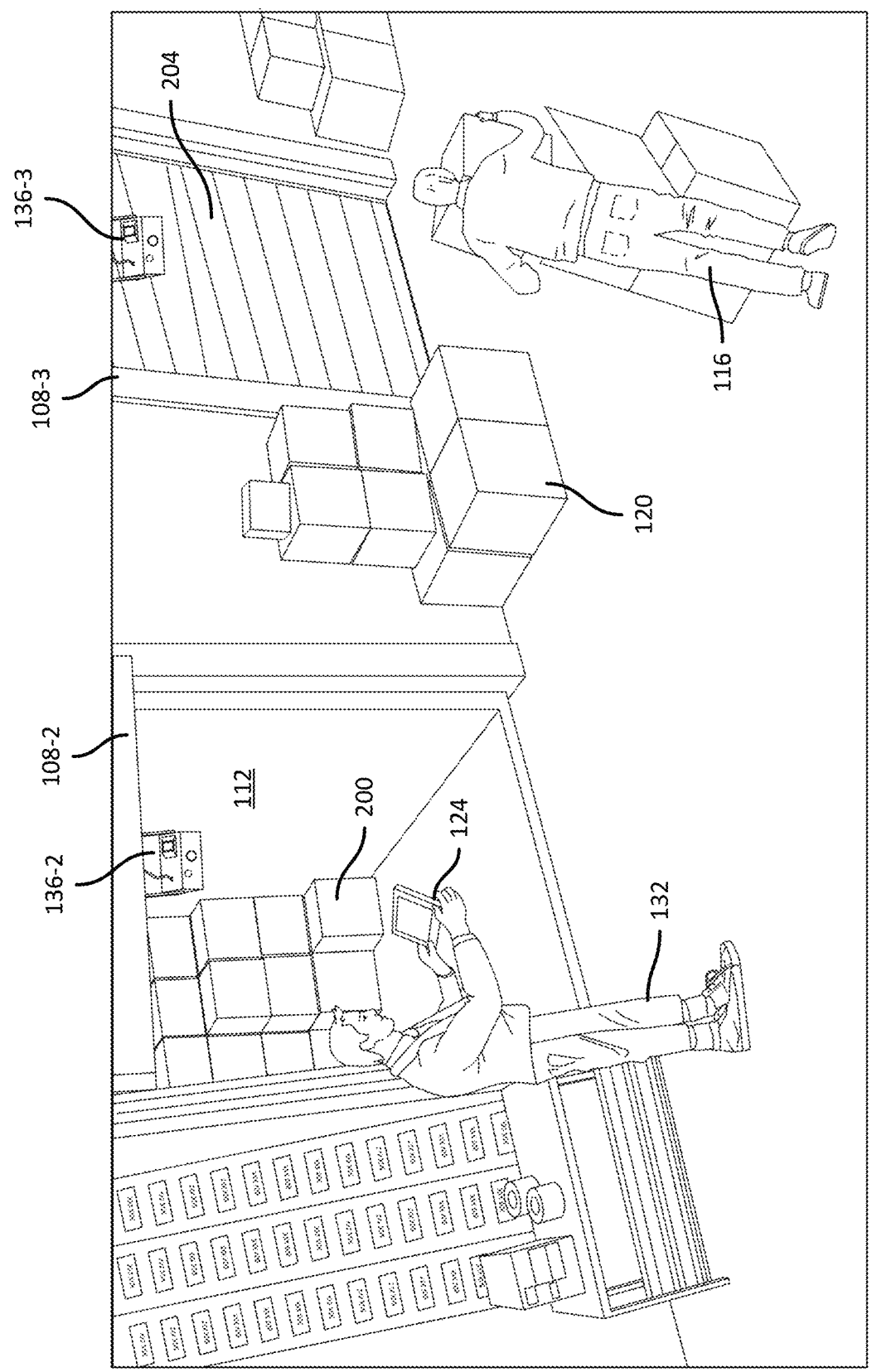
FIG. 2 is a diagram illustrating an interior of the facility shown in FIG. 1.

Turning to FIG. 2, a partial view from within the facility 104 is shown, once the container is received at the load bay 108-2, and loading or unloading of the container 112 has begun. In particular, loaded items 200 are shown within the partially loaded container 112, and further items 120 to be loaded are shown within the facility 104 adjacent to the load bay 108-2 and vice versa for unloading. As seen in FIG. 2, the sensor assemblies 136 are mounted at each load bay 108 to capture sensor data representing the interior of a container 112, when the container 112 is open. The load bay 108-3 is occupied by another container with a closed door 204 (e.g. because loading is complete, or has not yet begun).

Figure 3:
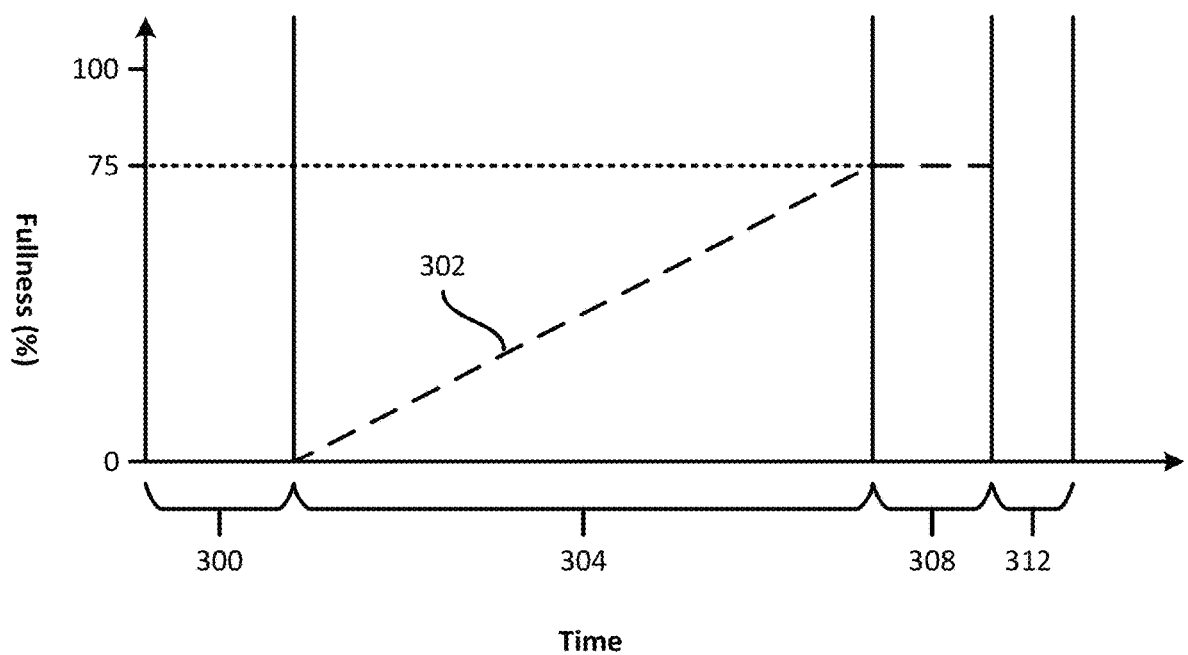
FIG. 3 is a diagram illustrating example stages of a container loading process.

Turning to FIG. 3, an example illustration of a set of loading stages as defined in the repository 166 is shown. Various other sets of stages may be represented in the repository 166, depending on the specific activities and/or layout of the facility 104. As illustrated in FIG. 3, in the current example implementation, the repository 166 contains stage definitions for four loading stages. The example stages shown in FIG. 3 are illustrated by the time each stage occupies (on the horizontal axis), and the expected fullness of the container 112 during each stage is shown on the vertical axis.

In particular, the defined stages include an initial stage 300, which may also be referred to as a pre-load stage during which a container that has been delivered to a load bay 108 is prepared for loading (or unloading, as noted earlier). Preparation for loading or unloading may include opening the door of the container, repositioning the items 120 within the facility 104, completing data entry by the worker 116, or the like.

As noted above, the repository 166 defines each stage by duration and intermediate performance target. The duration can be defined as a specific amount of time, or as a percentage or other fraction of the total time available to complete the load process. The total time available may be determined by an external process (e.g. executed on the server 128 itself or another computing device), e.g. based on scheduling and staff availability data. In other words, the durations defined in the repository 166 can be defined as relative quantities rather than absolute quantities. In some examples, the repository 166 may be updated dynamically by the above-mentioned external process, e.g. to reflect busier or less busy operations throughout the facility 104, e.g. by compressing some stages and lengthening others.

The initial stage 300, for example, can be defined in the repository 166 as having a duration of about 7.5% of the total process time, although other portions below or above 7.5% are also contemplated. The initial, or pre-load, stage 300 can also have an intermediate performance target of non-zero fullness, or of a specific minimum fullness target. That is, the expected state of the container by the expiry of the defined duration is to have a non-zero fullness. Stated another way, in a loading process, if the container 112 remains empty after the expiry of the pre-load stage 300 (or if the container 112 remains full after the expiry of the pre-load stage 300 in an unloading process), the system 100 may generate an alert. In the illustrated, idealized example, the container 112 begins being filled at the end of the stage 300, as indicated by the idealized work rate (a fill rate in this example, although in other cases the ideal work rate is an unload rate, or empty rate) plot 302. Various other intermediate performance targets may be defined in addition to, or instead of, the above non-zero fullness target. For example, the intermediate performance target may be an expected state of the door of the container 112 (e.g. that the door must be open by the end of the initial stage 300).

The stages defined in the repository 166 further include an active load stage 304, during which the items 120 are placed in the container 112, or during which items are removed from the container 112 into the facility (for unloading processes). The active load stage 304 may have a defined duration, for example, of about 80% of the total process time if specified as a portion of the total process time. As will be apparent, other portions below or above 80% may also be specified for the duration of the active load stage 304. The intermediate performance target for the active load stage 304 is a target fullness for the container 112. The target fullness may be determined by the above-mentioned external process, based on staffing and other resource allocation parameters, for example. As shown in FIG. 3, the target fullness for this example stage definition is 75% (that is, three quarters of the internal volume of the container 112 to be filled with the items 120). As will be apparent, however, the target fullness may vary across different load processes. Other intermediate performance targets may also be employed in addition to, or instead of, fullness targets. For example, an intermediate performance target may include a target fill rate (e.g. in percent fill level per minute, per hour, or the like), an estimated time to completion (ETC) based on a current work rate, and the like.

The stages defined in the repository 166 further include a final, or post-load, stage 308, e.g. during which the container 112 is prepared for removal from the load bay 108. The intermediate performance target for the stage 308 may, for example, be a state for the door of the container 112 (e.g. that the door must be closed). The duration of the stage 308, in this example, may be about 7% of the total process duration, although other portions may also be employed.

The stages defined in the repository 166 can further include a transitional stage 312, e.g. beginning when the previous container 112 is removed from the load bay 108, and ending when the next container 112 arrives at the load bay 108 (after which a new loading or unloading process, beginning with another instance of the stage 300, is initiated). The intermediate performance target for the stage 312 may be, for example, a state associated with the load bay 108 itself, e.g. that the load bay is occupied by a container 112 (as opposed to being empty) by the time the stage 312 ends. The duration of the stage 312 may be defined as, for example, 5.5% of the total process duration (although other portions may also be employed).

Figure 4:
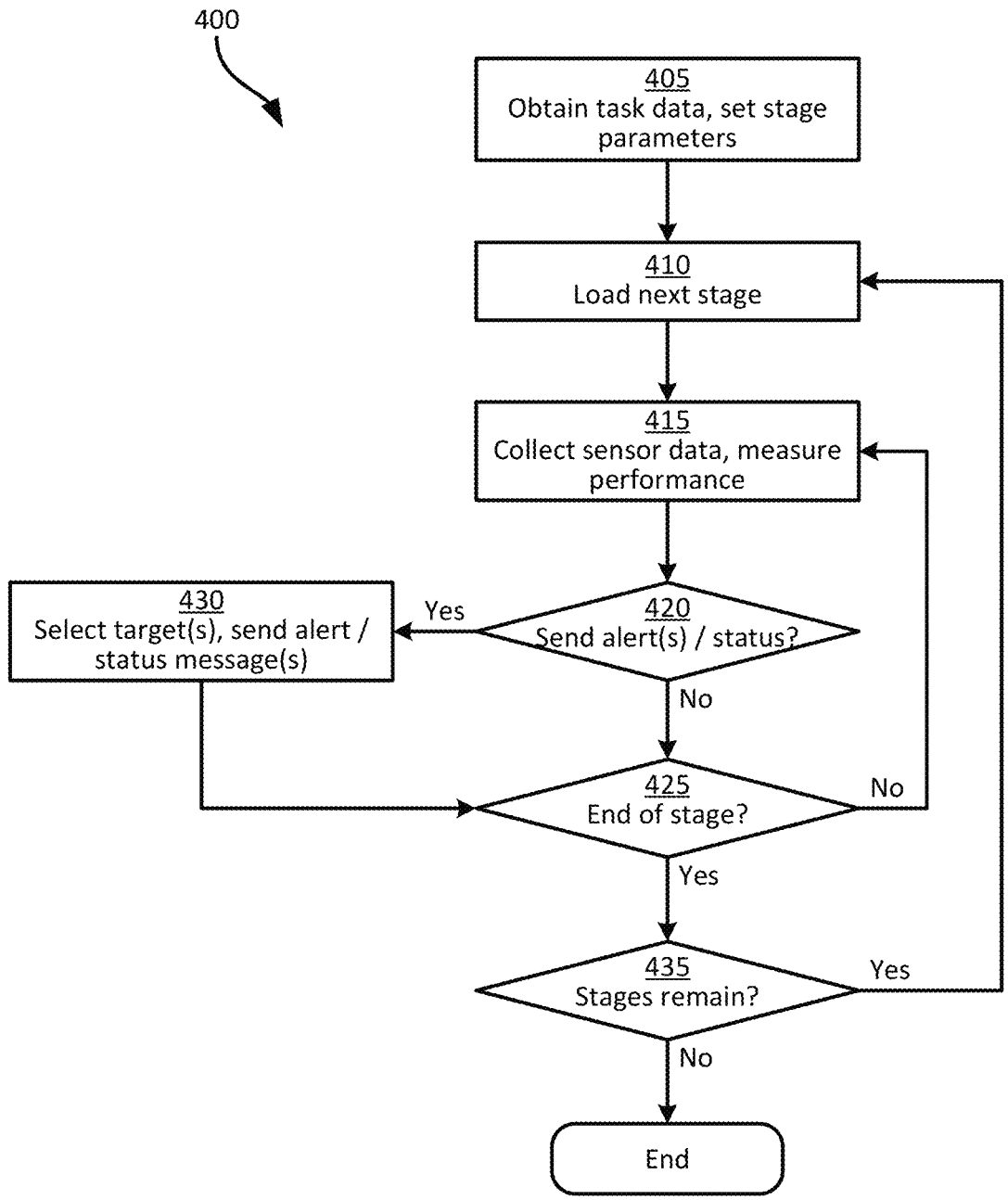
FIG. 4 is a flowchart of a method of monitoring and generating feedback for loading and unloading processes.

Referring now to FIG. 4, a method 400 of monitoring and generating feedback for a load process is shown. The method 400 will be described in conjunction with the example performance of the method 400 within the system 100. In particular, the blocks of the method 400 are performed by the server 128, as configured via execution of the application 162.

At block 405, the server 128 is configured to obtain a task definition (which may also be referred to as task data) corresponding to a load bay 108. In general, the task data defines a loading or unloading operation for a particular container 112 at a particular load bay 108. In this example, it is assumed that the task data defines a load operation for the container 112 at the load bay 108-2. The task data may be obtained, for example, substantially simultaneously with the arrival of the container 112 at the load bay 108-2.

The task data defines a performance target for the load process as a whole. The performance target includes at least one of a fullness target, e.g. expressed as a portion of the container volume to be filled with the items 120, and a time target, e.g. expressed as a total duration of the process or a specific time by which the process is expected to be completed. In some examples, the performance target specifies both a fullness target and a time target. For example, in the present performance of the method 400, the task data indicates that the container 112 is to be filled to 80% of its capacity by a specific time, e.g. a time one hour in the future from the time the container 112 arrives at the load bay 108-2.

The performance targets mentioned above may be generated at the server 128, or received from another server within the system 100. The performance targets may be adjusted periodically, and/or determined dynamically for each loading and unloading process, e.g. based on an item handling capacity of the facility 104 as a whole and on the total volume of items 120 currently being processed within the facility 104.

Figure 5:
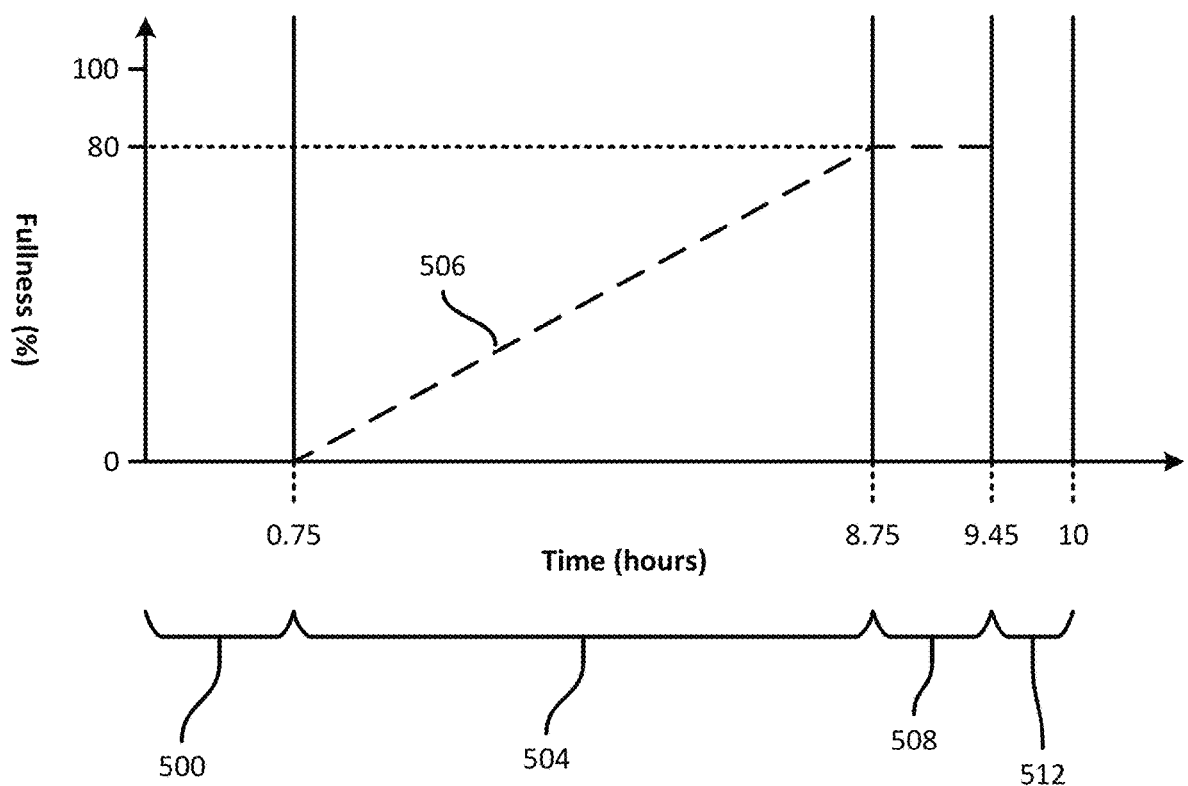
FIG. 5 is a diagram illustrating example stages of a container loading process.

Having received the task data, the server 128 is configured to retrieve the stage definitions from the repository 166 and generate process-specific stage definitions. For example, turning to FIG. 5, a set of stages for the current load process are illustrated, as generated based on the target completion time ten hours in the future (e.g. as received from another computing device of the system 100, or as computed by the server 128 itself), and the target fullness of 80% mentioned above (although as noted earlier a wide variety of target fullness values may be employed). When the stage durations are defined as portions of a total available time, the server 128 can be configured to translate the portions into specific amounts of time based on the task data. Thus, in this example, an initial stage 500 has a target duration of 45 minutes (i.e. 0.75 hours, corresponding to 7.5% as shown in FIG. 3) and an intermediate performance target of non-zero target fullness no later than expiry of the stage 500. An active load stage 504 has a duration of 8 hours (such that the stage 504 expires 8.75 hours from initiation of the process in this example) and an intermediate performance target of 80% fullness (i.e. the target fullness of the task definition). As shown in FIG. 5, the expected ideal work rate of the container 112 during the active load stage 504 is a rate 506.

A post-load stage 508 may have a duration of 42 minutes (e.g. 7% of the total process duration, as noted in connection with FIG. 3), and an intermediate performance target of a closed state for the door of the container 112. Finally, a transitional stage 512, although not directly related to the process of loading the container 112, may have a target duration of 33 minutes (e.g. 5.5% of the total process duration, as noted in connection with FIG. 3) and an intermediate performance target of an occupied state for the load bay 108-2 by the expiry of the stage 512.

Returning to FIG. 4, at block 410 the server 128 is configured to load the next stage. In the present example, no stages have been loaded or completed, and the server 128 is therefore configured to load the initial stage 500.

At block 415, the server 128 is configured to control the sensor assembly 136-2 to capture sensor data depicting the interior of the container 112. The sensor data can include, as noted earlier, either or both of image and depth data. Based on the sensor data, the server 128 is configured to determine a performance measurement corresponding to the load process. Various performance measurements may be determined at block 415, depending at least in part on the current stage. For example, the performance measurement(s) determined at block 415 includes a measurement of the same type as the intermediate performance target of the current stage.

As noted earlier, in this example the intermediate performance target for the initial stage 500 is a fullness target (specifically, a fullness level above zero). In some examples, the intermediate performance target can include the presence of worker(s) 116 in the container 112, i.e. within the FOV 140 of the sensor assembly 136. The server 128 therefore determines a current fullness level of the container 112 at block 415. Determining a fullness level can include, for example detecting items 120 within the container from the image and/or depth data, estimating the combined volume of the items 120, and comparing that estimated volume to a previously recorded total volume of the container 112. Other examples of performance measurements determined at block 415 will be discussed in connection with subsequent stages of the load process.

At block 420, the server 128 is configured to determine whether to generate and send any alerts and/or status messages, based on the intermediate performance target set by the stage definition loaded at block 410 and on the performance measurements from block 415. That is, each stage definition may also define alert and/or status message criteria, defining conditions under which alerts and/or status messages are generated at block 420. The determination of whether to generate alerts and/or status messages at block 420 will be described in greater detail further below. In general, the determination at block 420 includes a comparison between the intermediate performance target of the current stage and the performance measurement, as well as an assessment of whether timing criteria have been met for the generation of an alert and/or status message. The timing criteria, as will be apparent in the discussion below, enable the server 128 to deliver information to the client devices 124 for the alerts and/or status messages while mitigating user fatigue (e.g. for the supervisor 132) arising from an excessive volume of alerts and minimizing additional load on networks within the facility 104 and on the client devices 124 and their operators.

When the determination at block 420 is negative, the server 128 determines, at block 425, whether the current stage has ended. That is, at block 425 the server 128 determines whether the previously defined duration of the stage loaded at block 410 has expired. When the determination at block 425 is negative, the server 128 is configured to return to block 415 to collect further sensor data and update the performance measurement. The determination at block 420 is then repeated, proceeding to block 425 when no alert and/or status message is to be generated, or to block 430 when the determination at block 420 is affirmative. At block 430, as will be discussed below in greater detail, one or more alerts and/or status messages are transmitted from the server 128 to selected client devices 124.

When the determination at block 425 is affirmative, the server 128 is configured to determine, at block 435, whether stages remain to be processed. When further stages remain, the determination at block 435 is affirmative, and the server 128 returns to block 410. Otherwise (when all stages have been completed) the performance of the method 400 ends. A further instance of the method 400 may be initiated upon arrival of another container at the load bay 108.

Figure 6:
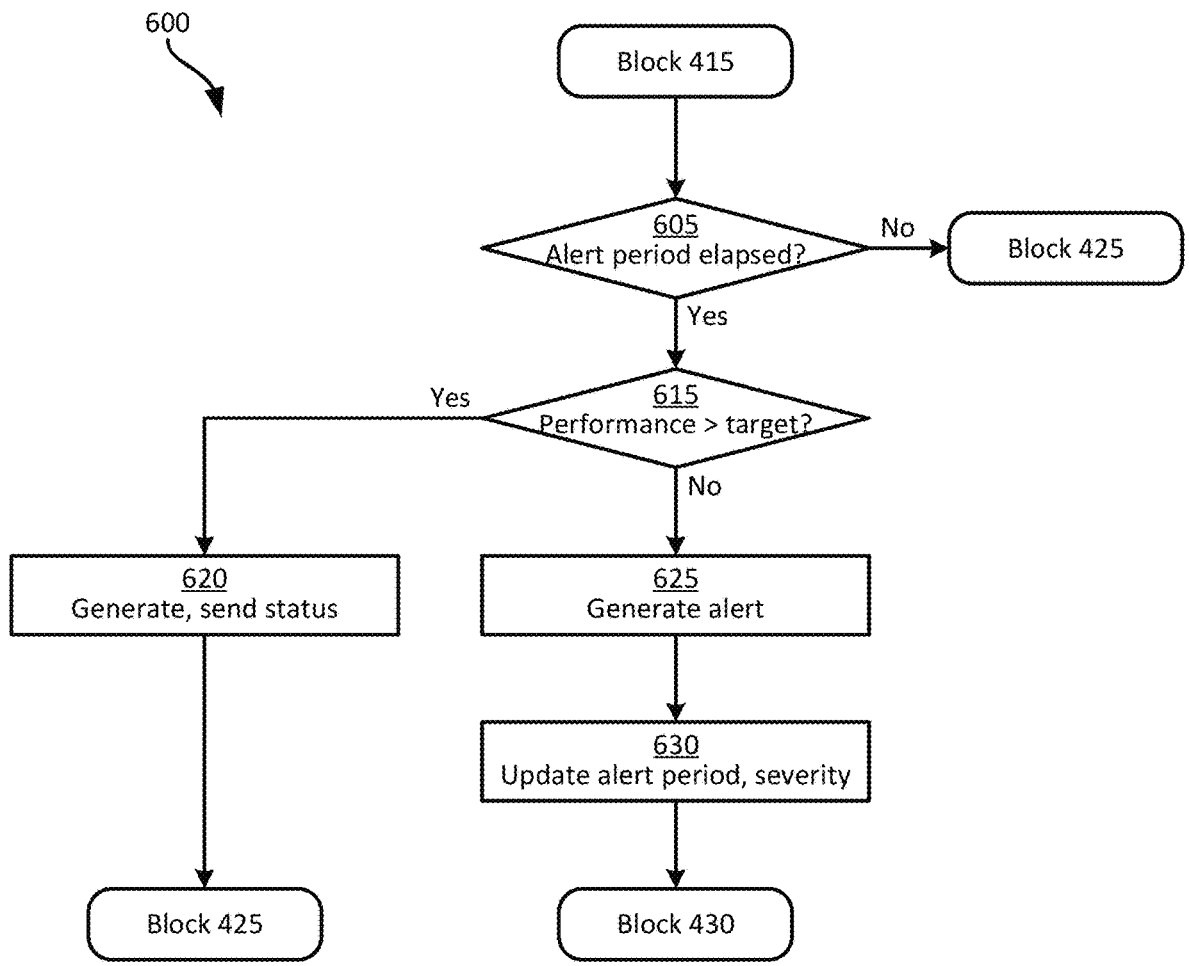
FIG. 6 is a flowchart of a method for performing block 420 of the method of FIG. 4.

Turning to FIG. 6, a method 600 of determining whether to generate alerts and/or status messages at block 420 is illustrated. The performance of method 600 will be described in conjunction with the performance of the method 400, to load the container 112 at the load bay 108-2. Having collected sensor data at block 415 and determined (in this example) a performance measurement in the form of a current fullness level for the container, the server 128 is configured, at block 605, to determine whether an alert period (which may also be referred to as a notification period, as both alert and status messages may result from the expiry of an alert period) has elapsed. The stage definitions mentioned earlier may also include definitions of one or more alert periods (i.e. periods after which a decision is triggered to evaluate process performance and generate alerts and/or status messages if necessary) within each stage. For example, the alert period for the initial stage 500, in this example, is the same as the stage duration itself. In other words, in the stage 500 the trigger for whether or not to generate an alert is the end of the stage 500 itself. When the determination at block 605 is negative, indicating that the alert period has not yet expired, no alert is generated regardless of the performance measurement, and the server 128 proceeds to block 425. This will help mitigate user fatigue (supervisor 132 and/or worker 116).

When the determination at block 605 is affirmative, the server 128 is configured to proceed to block 615 and evaluate the current performance measurement against the intermediate performance target for the relevant load stage. Based on that evaluation, as discussed below, the server 128 may send an alert and/or a status message to one or more client devices 124. In other examples, the order of the performance of blocks 605 and 615 may be reversed. That is, in some examples, the server 128 can be configured to evaluate the performance measurement from the current instance of block 415 against the intermediate performance target, to identify that performance issues exist with the load process, or that earlier performance issues have been resolved. The server 128 can then, after evaluating performance, determine at block 605 whether an alert period has elapsed and determine whether to send any alert and/or status messages according to that determination.

Figure 7:
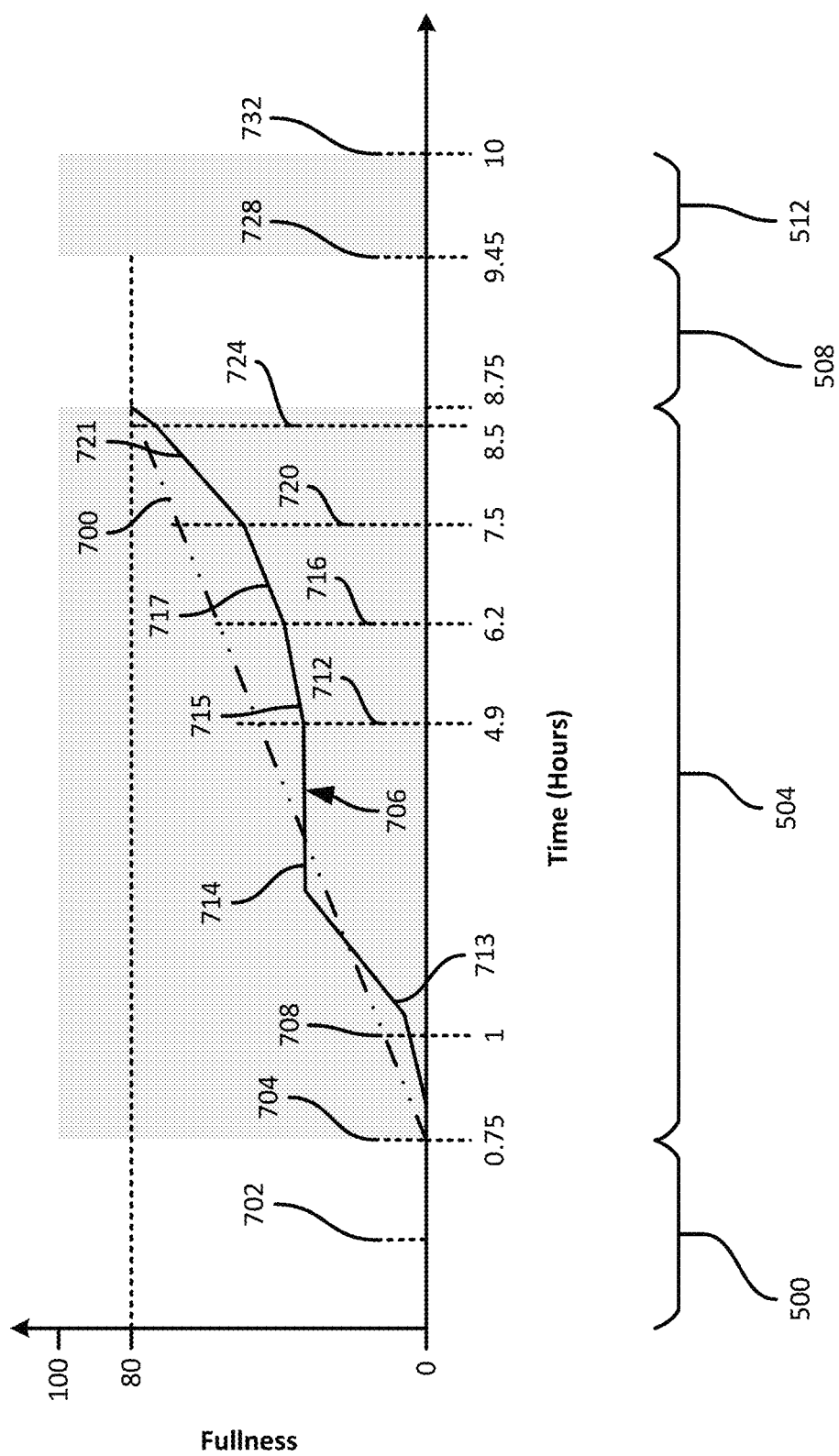
FIG. 7 is a diagram illustrating example performances of the methods of FIG. 4 and FIG. 6.

Turning to FIG. 7, the stages 500-512 are shown along with an ideal work rate 700. The performance of block 415 may be repeated at a sampling frequency of the sensor assembly 136-2, e.g. once every 15 seconds (although a wide variety of other sampling frequencies may also be employed). The determination at block 615, however, is only performed at particular trigger points, corresponding to the above-mentioned alert and/or status message periods. For example, at a time 702 about half-way through the first stage 500, the fullness level may be measured as zero via a performance of block 415, indicating that loading of the container 112 has not yet begun. The time 702 is, however, before the end of the initial stage 500, which coincides with the alert period defined for the initial stage 500. The determination at block 605 is therefore negative, which is equivalent to a negative determination at block 420. The server 128 therefore returns to block 415, captures another sample of sensor data, and determines a further performance measurement. Thus, another instance of the method 600 is initiated. This process repeats until the first alert period expires, which in this example is the end of the stage 500.

Referring again to FIG. 7, the time 704 coincides with the end of the duration of the initial stage 500, and therefore with expiry of the alert period for the stage 500. The determination at block 605 is therefore affirmative, and the server 128 proceeds to block 615. At block 615, the server determines whether the performance measurement from block 415, corresponding to sensor data captured at the trigger time 704, satisfies the intermediate performance target for the current stage. As will now be apparent, before the alert period has elapsed, the determination at block 615 is not made, and therefore no alerts are generated even when the performance measurement has not yet met the intermediate performance target. In other examples, however, in which the order of blocks 605 and 615 are reversed, the determination at block 615 may be made at least once before the trigger time 704, albeit with no alerts resulting until the trigger time 704 arrives.

As noted above, the intermediate performance target for the initial stage 500 is a non-zero fullness level. As seen in FIG. 7, the actual fullness level, indicated by a solid-line plot 706 at the time 704 remains zero, and therefore the determination at block 615 is negative. When the determination at block 615 is affirmative, the server 128 proceeds to block 425. In some examples, prior to advancing to block 425, the server 128 can generate and send a status message (rather than an alert indicating that action is needed to remedy a deficiency in the load process) at block 620. For example, as noted above, in some examples the server 128 may perform block 615 before block 605. Thus, the determination at block 615 may be affirmative, following which the server 128 may determine at block 605 to send a status message (i.e. to proceed to block 620).

The stage definitions of the repository 166 may also define conditions under which status messages are sent. In general, status messages are messages indicating that a previous deficiency in a load process has been remedied, and/or that the load process is proceeding as expected. The use of status messages may be omitted entirely for certain stages in some examples, according to the stage definitions.

In the event of a negative determination at block 615, however, as in this example performance of the method 600, the server 128 is configured to generate an alert at block 625 (i.e. the determination at block 420 is affirmative). The stage definitions in the repository 166 may also contain alert definitions for each stage (e.g. defining the content of an alert). In this example, it is assumed that the stage definition for the initial stage 500 includes a single alert definition for use when the fill level of the container 112 remains at zero upon expiry of the stage 500 at the time 704.

At block 630, the server 128 can be configured to update the alert period (e.g. to mitigate supervisor 132 and worker 116 information fatigue) and, optionally, an alert severity level. The stage definitions may also specify available severity levels for alerts. In the stage 500, it is assumed in this example that a single severity level is employed, and no update to the severity level is therefore required. Additionally, because the stage 500 generates at most one alert, no updated alert period is generated at block 630. The server 128 therefore proceeds to block 430.

Returning to FIG. 4, at block 430 the server 128 is configured to send the alert generated at block 625 to selected target client devices 124. The client devices 124 selected to receive the alert and/or status message at block 430 can be selected based on stored associations between client devices 124 and load bays 108, as well as the severity level mentioned above. For example, the server 128 may maintain, or access when such information is maintained at another computing device, a list of client computing devices 124 associated with the load bay 108-2, such as the devices operated by the worker 116 and the supervisor 132. The server 128 may transmit the generated alert and/or status message to a subset of such devices according to the severity level. For example, a minimum severity level may result in transmission of the alert only to client devices 124 associated with workers, while higher severity levels may result in the alert also being transmitted to the client device 124 operated by the supervisor 132.

Figure 8:
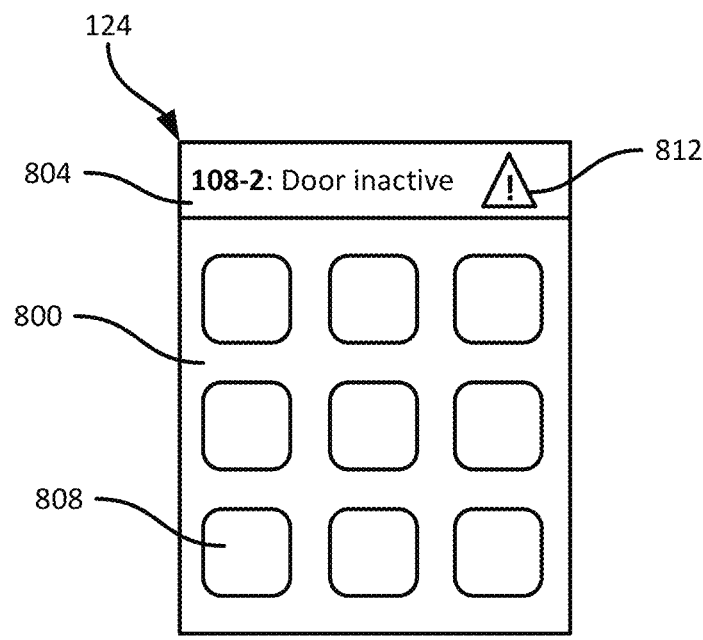
FIG. 8 is a diagram illustrating example alerts generated through performance of the methods of FIGS. 4 and 6.
Figure 8:
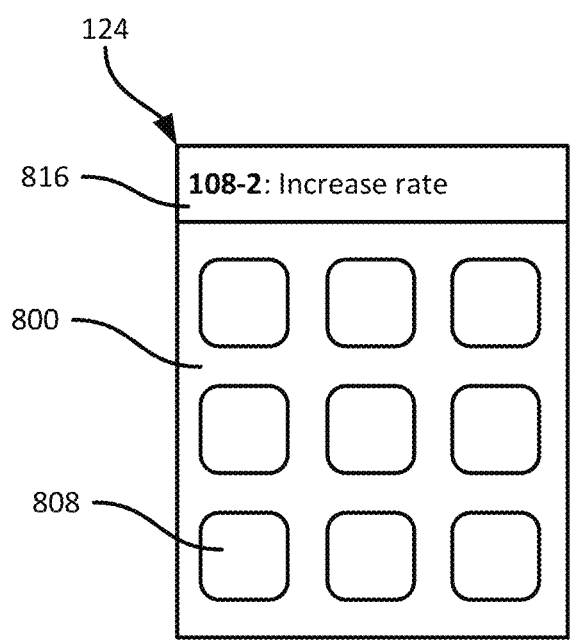

Turning briefly to FIG. 8, an example alert is presented on a display 800 of a client device 124. The alert may be presented, for example, as a notification element 804 superimposed on an underlying interface (e.g. including application launch icons 808, in this example). For instance, the notification element 804 may be generated over a home screen (containing the icons 808 commonly found on mobile smart phones running Android or iOS operating systems or tablet computers of rugged portable computers running Windows operating system) of the computing device 124. In other examples, the alert may be presented within an interface generated by a specific application executed by the client device 124, e.g. after launching that application via selection of a corresponding one of the icons 808. The notification element 804 includes an identifier of the load bay 108-2, as well as a string of text indicating the nature of the alert and/or status message (in this case, that loading activity has not begun as expected before the end of the initial stage 500). The notification element 804 can also include a severity indicator 812, e.g. a "warning" icon and/or pictogram in this example. A wide variety of other severity indicators can be used for the alerts described herein, including color-coded messages, text-based indicators, sound or vibration severity indicators, and the like.

Returning to FIG. 4, following block 430 the server 128 determines whether the current stage has ended at block 425. In this example performance of the method 400, the determination at block 425 is affirmative, because the duration specified for the stage 500 has elapsed. In other examples, the determination at block 425 may also be affirmative even though the duration for the relevant stage has not yet expired. In particular, if the intermediate performance target corresponding to a stage has been met (i.e. the determination at block 615 was affirmative), a stage may be deemed to have ended before the initial time set by the stage definitions. Effectively, an early ending of a stage may therefore lengthen the following stage by permitting the following stage to begin earlier.

The server 128 therefore returns to block 410, and loads data for the active load stage 504 shown in FIGS. 5 and 7. The stage definition for the stage 504 indicates that the intermediate performance target is a fullness level of 80% by the termination of the stage 504 (e.g. 8.75 hours after the start of the load process). The stage definition for the stage 504 also includes a set of rules defining successive alert periods and severity levels, to be discussed below.

At block 415, the server 128 is configured to collect further sensor data and determine a performance measurement. Because the intermediate performance target is a fullness level at completion of the stage 504, the performance measurement at block 415 can be a predicted fullness level at completion of the stage 504, e.g. based on a linear extrapolation of the current measured fullness. In other examples, the current measured fullness can be compared to an expected current fullness interpolated from the intermediate performance target. In some examples, the server 128 may employ a series of individual measurements from successive performances of block 415 to generate the performance measurement. For example, the server 128 may combine the most recent five (although other numbers of measurements may also be employed) to estimate a current fill rate of the container 112. The estimated fill rate may then be extrapolated as mentioned above at block 615.

The server 128 is then configured to perform block 420, e.g. by initiating an instance of the method 600. Specifically, the server 128 is configured to determine at block 605 whether the alert period has elapsed. Turning to FIG. 7, it is assumed that the first alert period defined for the stage 504 is at a time 708 since a deviation in work rate greater than a predetermined threshold (e.g. the work rate deviated by more than five percentage points from the ideal fill rate 700) was detected, e.g. about 15 minutes after the start of the stage 504 (or about 1 hour after the start of the whole process). As will be apparent, numerous performances of block 415 may occur between the times 704 and 708, but in the absence of an affirmative determination at block 605, no alert decision will be triggered from those performances of block 415. At the time 708, however, the determination at block 605 is affirmative, and a performance of block 615 is therefore triggered.

In other examples, such as the implementation mentioned earlier in which performance is evaluated at block 615 prior to the determination at block 605, the first alert period may be dynamically determined in that the determination at block 605 is automatically affirmative in response to an initial finding at block 615 that the performance measurement fails to meet the intermediate performance target. That is, at the time 708, the server 128 may have accumulated sufficient samples to assess a work rate at block 415, and if that work rate indicates that the target fill level will not be met, the server 128 determines at block 605 that an alert is to be sent substantially immediately.

As seen in FIG. 7, the performance measurement representing the current fill rate of the container 112 (indicated on the solid plot 706) spends more than half of the stage below the fill rate required to achieve the intermediate performance target (of 80% fullness). Following the affirmative determination at block 605, the determination at block 615 is negative because the measured fill rate is below the rate required to achieve the target fill level. The server 128 is therefore configured to generate an alert at block 625, e.g. at an initial severity level. For example, the stage 504 may define three escalating severity levels, with the lowest being the default level.

At block 630, in response to generating an alert at the first of the above-mentioned severity levels, the server 128 can update either or both of the alert period and the severity level. For example, the server 128 can be configured to increment the current severity level, such that the next alert generated via the method 600 (within the stage 504) has the second of the above-mentioned three severity levels. The server 128 can further determine a subsequent alert interval based on a current time and the duration of the stage 504. For example, the stage definition for the stage 504 may specify that in addition to the first alert period discussed above, four additional alert periods are to be employed, beginning at the half-way point between the first alert period (at the time 708) and a time at or shortly before the end of the stage 504 (e.g. a time about 15 minutes before the end of the stage 504 is used in FIG. 7). As shown in FIG. 7, the remaining alert periods may expire at times 712, 716, 720, and 724, e.g. with the times 716 and 720 equally dividing the period between the times 712 and 724.

At block 430 of the method 400, the server 128 is configured to send the alert generated at block 625, e.g. to the client device 124 operated by the worker 116, or to the client device 124 operated by the supervisor 132, or both. FIG. 8 illustrates a notification element 816 presented on the display 800, indicating that the fill rate for the container 112 must be increased. The notification element 816 may not include an icon or pictogram similar to that used to implement the indicator 812 in the notification element 804 mentioned earlier, as in this example the severity associated with this alert is at the minimum level. However, the notification element 816 may include another form of severity indicator, such as color-coding of the text in the notification element 816, the background to that text, or the like.

The determination at block 425 is negative, because the stage 504 has not yet ended. The server 128 therefore repeats the performance of blocks 415, 420, 430 (as applicable) and 435 until the determination at block 425 is affirmative. For example, turning to FIG. 7, a further performance of block 415 may reveal that the current fill rate of the container 112 has increased sufficiently to meet the intermediate performance target, e.g. as shown at the segment 713 illustrating an increased slope relative to the ideal fill rate 706. In some examples, because the next alert period (expiring at 712) has not yet elapsed, no notifications are generated in response to the increase in performance. In other examples, however, separate alert periods may be specified for status messages. In further examples, the server 128 may be configured to generate one alert and/or status message prior to expiry of the alert period ending at 712 in response to a recovery of the work rate, e.g. as detected at the segment 713, regardless of the specific time at which the recovery is detected.

Figure 9:
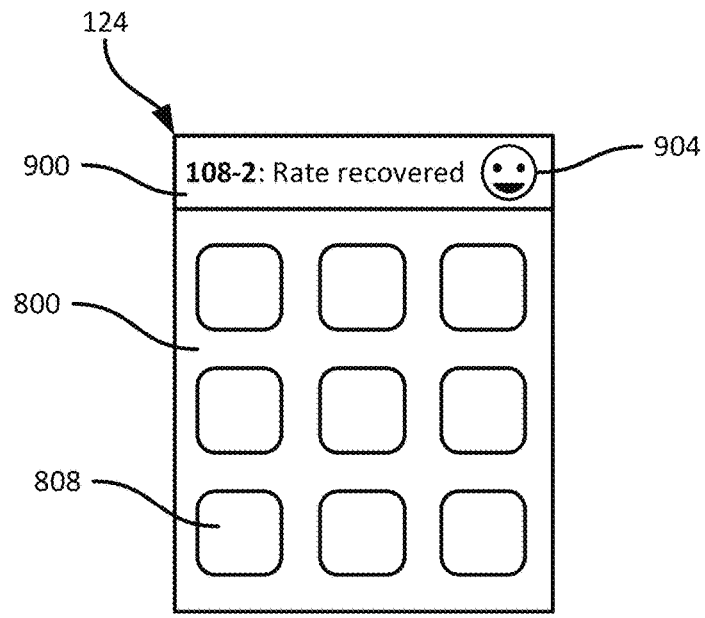
FIG. 9 is a diagram illustrating further example alerts and status messages generated through performance of the methods of FIGS. 4 and 6.
Figure 9:
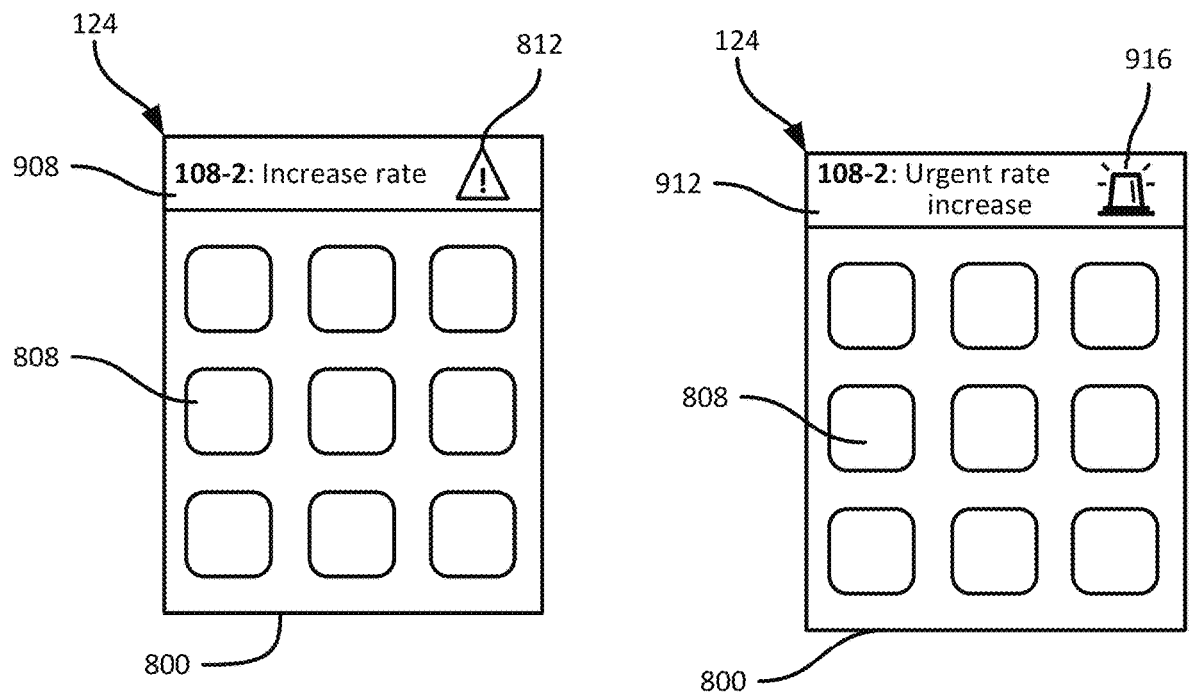

At block 620, for example, the server 128 generates and sends a status message to the client device(s) 124. The status message indicates that the fill rate has recovered, and may have the lowest severity level, or a distinct non-alert severity level. For example, as shown in FIG. 9, a notification element 900 may be presented on the display 800 containing the status message, indicating that the fill rate has recovered, and a non-alert severity indicator 904 (e.g. distinct from the severity indicators employed for alerts). In response to sending the status message at block 620, the server 128 may optionally update the severity level for subsequent messages, e.g. by decrementing the severity level if the severity level was previously raised (e.g. following the alert generated at the time 708).

Subsequently, the work rate may decrease, as indicated by the segment 714 (where loading is idle). However, the server 128 does not generate any alerts in this implementation until the alert period expiring at the time 712 has elapsed. When the time 712 arrives, the determination at block 605 is affirmative (because the time 712, shortly before 5 hours into the load process, marks expiry of the next alert period, as mentioned above), and the determination at block 615 is negative, because the current work rate indicates that the intermediate performance target will not be met. In this example, at block 625, the server 128 is therefore configured to generate an alert such as the notification element 816 shown in FIG. 8. At block 630, the severity level may be incremented (e.g. returning to the second of three levels, having been decremented back to the first level following the status message mentioned above).

Prior to the time 716 (corresponding to the expiry of a further alert period), the measured fill rate (for the segment 715 of the plot 706) has increased relative to the ideal fill rate 700, but remains below a rate required to reach the target fill level by the end of stage 504, and the server 128 therefore generates a further alert for transmission at the time 716. As noted above, the severity level for this alert is increased relative to the first alert generated at the time 712. In some examples, a recovery such as that detected for the segment 713 can lead to decrementing the severity level, while in other examples, the severity level only increments, or is prevented from decrementing when the time remaining before the end of the stage 504 is below a threshold (e.g. if less than 25%, or any other suitable portion, of the stage 504 remains). In the present example, the alert generated at the time 716 has an increased severity level relative to the alert 816 shown in FIG. 8. In particular, FIG. 9 shows a notification element 908 containing an alert indicating the need for an increased fill rate, with the previously mentioned severity indicator 812. In some examples, the severity indicator may be further increased at block 630. In other examples, however, the severity level may be increased to the third and highest level only when within a certain time of the end of the stage 504 (e.g. 15 minutes, coinciding with expiry of the final alert period at the time 724).

Between the time 716 and the time 720, the work rate increases yet again relative to the ideal fill rate 700, as shown by the segment 717 of the plot 706. However, the work rate remains too low to reach the intermediate performance target. Via another performance of blocks 415, 420 (via the method 600) and 430, the server therefore 128 generates and sends a further alert. In this example, the severity indicator was unchanged following the previous alert, and therefore another alert similar to that shown in the notification element 908 may be generated.

Following the alert mentioned above, the work rate may further increase, e.g. as shown by the segment 721. However, the increased work rate remains insufficient to meet the intermediate performance target. The server 128 therefore generates, at the time 724, a further alert, with the third (and in this case, maximal) severity level. FIG. 9 illustrates a notification element 912 indicating an urgent need for additional resources at the load bay 108-2 to increase the fill rate, and may include a further severity indicator 916. The alert 912 may be transmitted to additional client devices 124 beyond those of the worker 116 and the supervisor 132, in some examples.

As shown in FIG. 7, by the end of the stage 504, the intermediate performance target has been met as a result of an increased filling rate between the time 724 and the end of the stage 504, and therefore no further alert is sent. A status message such as the message 900 shown in FIG. 9 may be sent at the end of the stage 504, however.

After termination of the stage 504, the final, or post-load, stage 508 is loaded at block 410, and blocks 415, 420 and 425 (and block 430 as applicable) are performed at least once for the stage 508. It is assumed in this example that a single alert period and severity level are used for the stage 508. For example, at the time 728 the server 128 may determine a performance measurement indicating whether the door of the container 112 is closed. If the door is not closed, an alert may be generated indicating that door closing is late at the load bay 108-2.

Processing of the stage 512 may also employ a single alert period, ending at the time 732, and a single severity level. In particular, in performing block 415 for the stage 512, the server 128 can determine, as a performance measurement, whether the load bay 108-2 is occupied, after departure of the previous container. When the load bay 108-2 is not occupied, the determination at block 615 is negative, and a further alert may be generated, e.g. indicating that the next container is late in arriving at the load bay 108-2.

Figure 10:
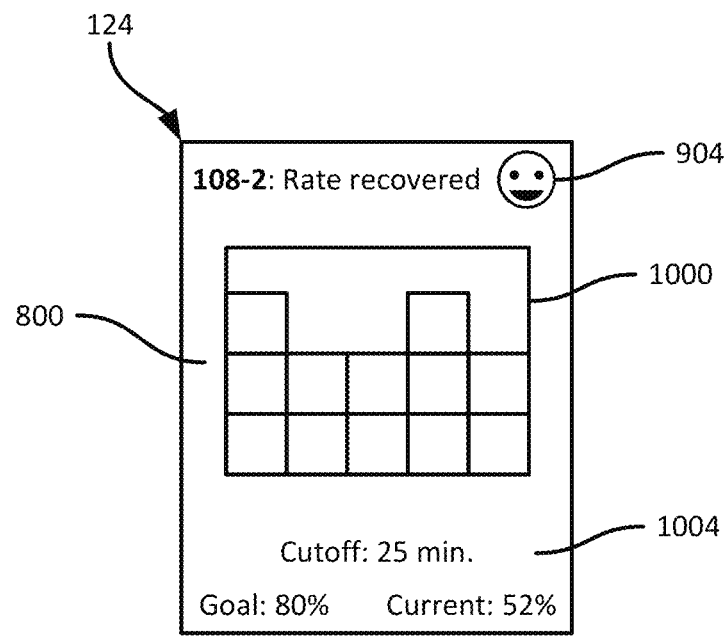
FIG. 10 is a diagram illustrating additional example alerts and status messages generated through performance of the methods of FIGS. 4 and 6.
Figure 10:
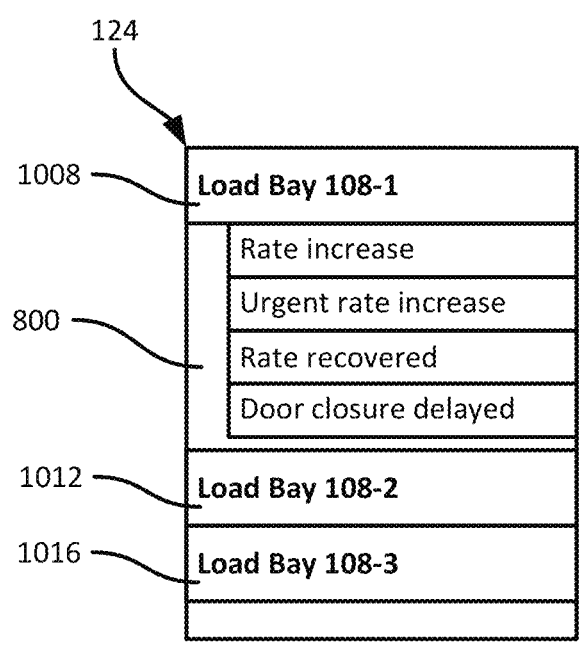

Various additional information may also be included in the alerts mentioned above, or may be retrievable, e.g. by selecting a notification element provided via such an alert. For example, as shown in FIG. 10, the client device 124 may receive additional information from the server 128, including a current image 1000 of the container 112 interior captured by the sensor assembly 136-2, and current status data measured at block 415, including a current fill level, the target fill level, and a time remaining until the end of the stage 504.

In some examples, multiple alerts and/or status messages may be presented in a stacked arrangement, e.g. at the client device 124 of the supervisor 132. For example, a notification application executed by the client device 124 may present nested sets of alerts and/or status messages 1008, 1012, and 1016 for the respective load bays 108. Selection of a given set (e.g. selection of the set 1008 in the example illustrated in FIG. 10 may expand a list of recent alerts and/or status messages issued in connection with that load bay 108, e.g. in ascending or descending chronological order. The alerts and/or status messages may also be listed in other orders, e.g. by severity.

Figure 11:
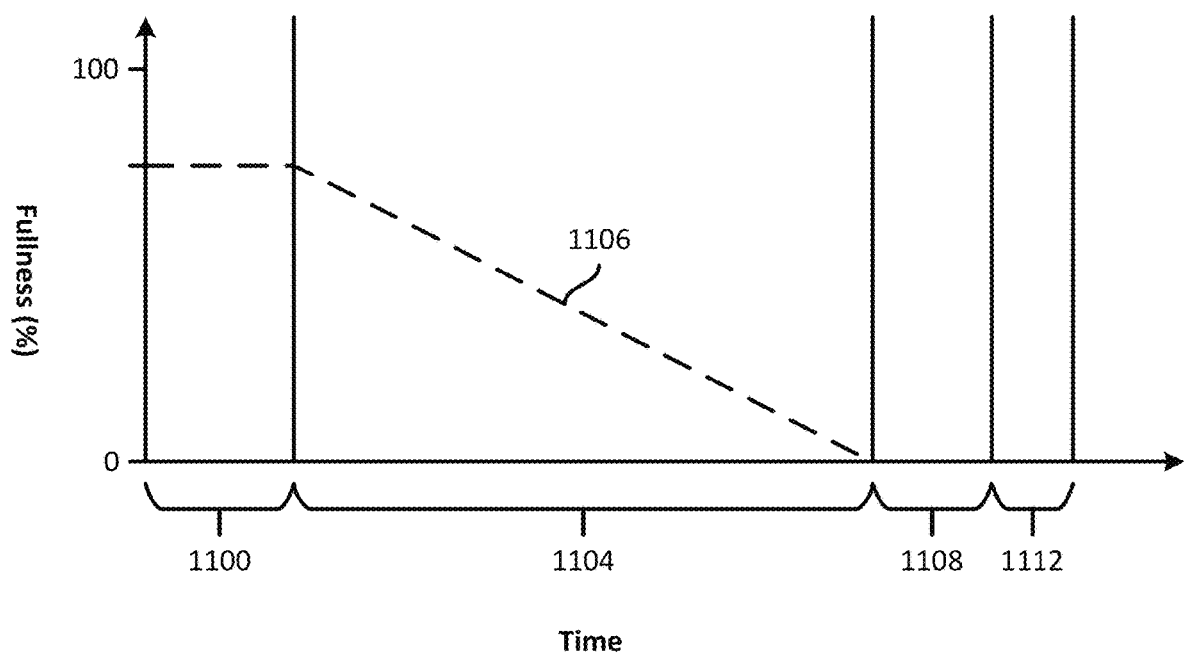
FIG. 11 is a diagram illustrating example stages of a container unloading process.

As noted earlier, the methods 400 and 600 implemented by the server 128 may also be applied to unloading processes, in which the container 112 arrives at a load bay 108 full or partially full, and items 120 therein are removed from the container 112 to the facility 104. FIG. 11 illustrates an idealized container unloading process. Each stage of the unloading process, as with the loading process shown in FIG. 3, can be defined by a duration and an intermediate performance target. For example, the unloading process can include an initial stage 1100, assigned a duration of a certain portion (e.g. 10%) of the total available time for unloading, and with an intermediate performance target indicating a non-zero container fullness by the end of the stage 1100.

The unloading process may also include an active unloading stage 1104, having a duration defined as a further portion (e.g. 80%) of the total available time, and an intermediate performance target of a fullness level of zero. In other examples, the intermediate performance target can be a target negative fill rate, e.g. also called empty rate as indicated by the slope of the plot 1106. The unloading process may also include a final, or post-load stage 1108, in which the now-empty container 112 is prepared for removal from the load bay 108. As with the final stage 308 mentioned earlier, the intermediate performance target for the stage 1108 may be a state of the door of the container 112 (e.g. the door may be expected to be closed at the end of the stage 1108). The process may further include a transitional stage 1112, equivalent to the transitional stage 312 discussed in connection with FIG. 3.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   storing, in a memory of a computing device, a set of load stage definitions defining sequential load stages of a container load process, each stage definition including:
   (i) an intermediate performance target, and (ii) a stage duration;
   at a processor of the computing device, responsive to arrival of a container at a load bay, receiving a task definition defining a performance target for the load process;
   at the processor, retrieving the load stages in sequence and, for each stage:
   (i) receiving sensor data depicting an interior of the container, from a sensor assembly including at least one of an image sensor and a depth sensor, the sensor assembly being disposed at the load bay such that a field of view of the sensor assembly is directed from the load bay into the interior of the container,
   (ii) determining, based on the sensor data, a performance measurement of the container load process,
   (iii) comparing the performance measurement to the intermediate performance target corresponding to the stage, and
   (iv) generating, based on the comparison and timing criteria associated with an alert period corresponding to the stage, an alert for transmission to a subset of client computing devices among a plurality of client computing devices when the performance measurement does not exceed the intermediate performance target corresponding to the stage and the alert period within the stage has elapsed, wherein
   the intermediate performance target sets an expected state of the container at an expiration of the stage duration.

2. The method of claim 1, wherein the stage duration of each stage definition is defined as one of (i) a period of time, or (ii) a portion of a total time corresponding to the load process; and
   wherein the task definition defines the total time.

3. The method of claim 1, wherein the stage definition defines a sequence of alert periods; and
   wherein the method further comprises repeating the determining a performance measurement and generating the alert, for each alert period.

4. The method of claim 1, wherein a client computing device includes at least one of a worker device and a supervisor device; and wherein the method further comprises:
   responsive to generating the alert, selecting at least one of the worker device and the supervisor device to receive the alert.

5. The method of claim 1, wherein the load stages include an initial stage having an intermediate performance target defining a non-zero fill level of the container.

6. The method of claim 1, wherein the load stages include an active load stage having an intermediate performance target defining at least one of a final fill level of the container and a fill rate.

7. The method of claim 1, wherein the load stages include a final stage having an intermediate performance target indicating a closed state for a door of the container.

8. The method of claim 1, wherein the load stages include a transitional stage having an intermediate performance target indicating an occupied state for the load bay.

9. The method of claim 1, wherein the performance measurement includes at least one of a container fill level, an estimated time to completion (ETC), and a container door state.

10. A computing device comprising:
    a memory storing a set of load stage definitions defining sequential load stages of a container load process, each stage definition including: (i) an intermediate performance target, and (ii) a stage duration;
    a communications interface; and
    a processor configured to:
    responsive to arrival of a container at a load bay, receive a task definition defining a performance target for the load process;
    retrieve the load stages in sequence and, for each stage:
    (i) receive sensor data depicting an interior of the container, from a sensor assembly including at least one of an image sensor and a depth sensor, the sensor assembly being disposed at the load bay such that a field of view of the sensor assembly is directed from the load bay into the interior of the container,
(ii) determine, based on the sensor data, a performance measurement of the container load process,
(iii) compare the performance measurement to the intermediate performance target corresponding to the stage, and
(iv) generate, based on the comparison and timing criteria associated with an alert period corresponding to the stage, an alert for transmission to a subset of client computing devices among a plurality of client computing devices when the performance measurement does not exceed the intermediate performance target corresponding to the stage and the alert period within the stage has elapsed, wherein
the intermediate performance target sets an expected state of the container at an expiration of the stage duration.

11. The computing device of claim 10, wherein the stage duration of each stage definition is defined as one of (i) a period of time, or (ii) a portion of a total time corresponding to the load process; and
wherein the task definition defines the total time.

12. The computing device of claim 10, wherein the stage definition defines a sequence of alert periods; and
wherein the processor is further configured to repeat the determination of the performance measurement and generation of the alert, for each alert period.

13. The computing device of claim 10, wherein a client computing device includes at least one of a worker device and a supervisor device; and wherein the processor is further configured to:
responsive to generating the alert, select at least one of the worker device and the supervisor device to receive the alert.

14. The computing device of claim 10, wherein the load stages include an initial stage having an intermediate performance target defining a non-zero fill level of the container.

15. The computing device of claim 10, wherein the load stages include an active load stage having an intermediate performance target defining at least one of a final fill level of the container and a fill rate.

16. The computing device of claim 10, wherein the load stages include a final stage having an intermediate performance target indicating a closed state for a door of the container.

17. The computing device of claim 10, wherein the load stages include a transitional stage having an intermediate performance target indicating an occupied state for the load bay.

18. The computing device of claim 10, wherein the performance measurement includes at least one of a container fill level, an estimated time to completion (ETC), and a container door state.

* * * * *